(12) United States Patent
Katar et al.

(10) Patent No.: US 7,660,327 B2
(45) Date of Patent: Feb. 9, 2010

(54) TEMPORARY PRIORITY PROMOTION FOR NETWORK COMMUNICATIONS IN WHICH ACCESS TO A SHARED MEDIUM DEPENDS ON A PRIORITY LEVEL

(75) Inventors: Srinivas Katar, Ocala, FL (US); Lawrence W. Yonge, III, Ocala, FL (US)

(73) Assignee: Atheros Communications, Inc., Santa Clara, CA (US)

( * ) Notice: Subject to any disclaimer, the term of this patent is extended or adjusted under 35 U.S.C. 154(b) by 665 days.

(21) Appl. No.: 10/771,136

(22) Filed: Feb. 3, 2004

(65) Prior Publication Data

US 2005/0169296 A1 Aug. 4, 2005

(51) Int. Cl.
*H04L 12/43* (2006.01)
(52) U.S. Cl. ...................................... 370/461
(58) Field of Classification Search ......... 370/442–444, 370/447, 458, 461–462
See application file for complete search history.

(56) References Cited

U.S. PATENT DOCUMENTS

| | | | |
|---|---|---|---|
| 3,806,885 A | 4/1974 | Moore | |
| 4,569,044 A | 2/1986 | Tao et al. | |
| 4,581,734 A | 4/1986 | Olson et al. | |
| 4,630,261 A | 12/1986 | Irvin | |
| 4,663,757 A | 5/1987 | Huang et al. | |
| 4,677,612 A | 6/1987 | Olson et al. | |
| 4,682,324 A | 7/1987 | Ulug | |
| 4,720,850 A | 1/1988 | Oberlander et al. | |
| 4,726,018 A | 2/1988 | Bux et al. | |
| 4,792,947 A | 12/1988 | Takiyasu et al. | |
| 4,819,229 A | 4/1989 | Pritty et al. | |
| 4,881,241 A | 11/1989 | Pommier et al. | |
| 4,943,959 A | 7/1990 | Arnold | |
| 5,001,472 A | 3/1991 | Fischer et al. | |
| 5,003,539 A | 3/1991 | Takemoto et al. | |
| 5,046,069 A | 9/1991 | Calvignac et al. | |

(Continued)

FOREIGN PATENT DOCUMENTS

DE 3413144 10/1985

(Continued)

OTHER PUBLICATIONS

U.S. Appl. No. 09/632,303.

(Continued)

*Primary Examiner*—Kwang B Yao
*Assistant Examiner*—Tung Q Tran
(74) *Attorney, Agent, or Firm*—Fish & Richardson P.C.

(57) ABSTRACT

A method of operating in a network in which a plurality of stations communicate over a shared medium (e.g., using a carrier sense multiple access (CSMA) service). The stations contend for access to the shared medium using a contention procedure that relies on a priority level, wherein transmissions with a lower priority level have a reduced chance of gaining access to the shared medium during a contention process. Selected stations are given the capability of temporarily promoting the priority level of transmissions they are attempting to make. The priority level is increased during an interval to reduce the chance that other stations gain access to the shared medium during that interval, and the priority level is restored to its normal level following the interval.

34 Claims, 13 Drawing Sheets

U.S. PATENT DOCUMENTS

| | | |
|---|---|---|
| 5,081,678 A | 1/1992 | Kaufman et al. |
| 5,105,423 A | 4/1992 | Tanaka et al. |
| 5,121,396 A | 6/1992 | Irvin et al. |
| 5,140,584 A | 8/1992 | Suzuki |
| 5,157,659 A | 10/1992 | Schenkel |
| 5,197,061 A | 3/1993 | Halbert-Lassalle et al. |
| 5,214,646 A | 5/1993 | Yacoby |
| 5,228,025 A | 7/1993 | Le Floch et al. |
| 5,231,634 A | 7/1993 | Giles et al. |
| 5,274,629 A | 12/1993 | Helard et al. |
| 5,280,480 A | 1/1994 | Pitt et al. |
| 5,307,376 A | 4/1994 | Castelain et al. |
| 5,339,313 A | 8/1994 | Ben-Michael et al. |
| 5,343,473 A | 8/1994 | Cidon et al. |
| 5,384,777 A | 1/1995 | Ahmadi et al. |
| 5,416,801 A | 5/1995 | Chouly et al. |
| 5,426,646 A | 6/1995 | Slack |
| RE35,001 E | 7/1995 | Grow |
| 5,432,848 A | 7/1995 | Butter et al. |
| 5,436,905 A | 7/1995 | Li et al. |
| 5,448,565 A | 9/1995 | Chang et al. |
| 5,452,288 A | 9/1995 | Rahuel et al. |
| 5,452,322 A | 9/1995 | Lauer |
| 5,473,602 A | 12/1995 | McKenna et al. |
| 5,481,535 A | 1/1996 | Hershey |
| 5,483,529 A | 1/1996 | Baggen et al. |
| 5,488,632 A | 1/1996 | Mason et al. |
| 5,504,747 A | 4/1996 | Sweazey |
| 5,515,379 A | 5/1996 | Crisler et al. |
| 5,524,027 A | 6/1996 | Huisken |
| 5,537,414 A | 7/1996 | Takiyasu et al. |
| 5,541,922 A | 7/1996 | Pyhalammi |
| 5,548,649 A | 8/1996 | Jacobson |
| 5,555,268 A | 9/1996 | Fattouche et al. |
| 5,563,883 A | 10/1996 | Cheng |
| 5,563,897 A | 10/1996 | Pyndiah et al. |
| 5,568,476 A | 10/1996 | Sherer et al. |
| 5,610,908 A | 3/1997 | Shelswell et al. |
| 5,612,975 A | 3/1997 | Becker et al. |
| 5,615,212 A | 3/1997 | Ruszczyk et al. |
| 5,619,651 A | 4/1997 | Young |
| 5,623,512 A | 4/1997 | Sasaki |
| 5,627,829 A | 5/1997 | Gleeson et al. |
| 5,629,948 A | 5/1997 | Hagiwara et al. |
| 5,636,230 A | 6/1997 | Marturano et al. |
| 5,644,576 A | 7/1997 | Bauchot et al. |
| 5,651,009 A | 7/1997 | Perreault et al. |
| 5,694,389 A | 12/1997 | Seki et al. |
| 5,706,348 A | 1/1998 | Gray et al. |
| 5,717,689 A | 2/1998 | Ayanoglu |
| 5,732,113 A | 3/1998 | Schmidl et al. |
| 5,737,330 A | 4/1998 | Fulthorp et al. |
| 5,745,769 A | 4/1998 | Choi |
| 5,757,766 A | 5/1998 | Sugita |
| 5,757,770 A | 5/1998 | Lagoutte et al. |
| 5,764,931 A | 6/1998 | Schmahl et al. |
| 5,771,235 A | 6/1998 | Tang et al. |
| 5,787,071 A | 7/1998 | Basso et al. |
| 5,790,541 A | 8/1998 | Patrick et al. |
| 5,793,307 A | 8/1998 | Perrault et al. |
| 5,799,033 A | 8/1998 | Baggen |
| 5,812,599 A | 9/1998 | Van Kerckhove |
| 5,818,821 A | 10/1998 | Schurig |
| 5,818,826 A | 10/1998 | Gfeller et al. |
| 5,825,807 A | 10/1998 | Kumar |
| 5,828,677 A | 10/1998 | Sayeed et al. |
| 5,841,778 A | 11/1998 | Shaffer et al. |
| 5,841,873 A | 11/1998 | Lockhart et al. |
| 5,884,040 A | 3/1999 | Chung |
| 5,886,993 A | 3/1999 | Ruszczyk et al. |
| 5,892,769 A | 4/1999 | Lee |
| 5,896,561 A | 4/1999 | Schrader et al. |
| 5,903,614 A | 5/1999 | Suzuki et al. |
| 5,914,932 A | 6/1999 | Suzuki et al. |
| 5,914,959 A | 6/1999 | Marchetto et al. |
| 5,940,399 A | 8/1999 | Weizman |
| 5,940,438 A | 8/1999 | Poon et al. |
| 5,948,060 A | 9/1999 | Gregg et al. |
| 5,956,338 A | 9/1999 | Ghaibeh |
| 5,966,412 A | 10/1999 | Ramaswamy |
| 5,970,062 A | 10/1999 | Bauchot |
| 5,987,011 A | 11/1999 | Toh |
| 6,005,894 A | 12/1999 | Kumar |
| 6,006,017 A | 12/1999 | Joshi et al. |
| 6,041,063 A | 3/2000 | Povlsen et al. |
| 6,041,358 A | 3/2000 | Huang et al. |
| 6,044,154 A | 3/2000 | Kelly |
| 6,044,482 A | 3/2000 | Wong |
| 6,052,377 A | 4/2000 | Ohmi et al. |
| 6,076,115 A | 6/2000 | Sambamurthy et al. |
| 6,092,214 A | 7/2000 | Quoc et al. |
| 6,097,703 A | 8/2000 | Larsen et al. |
| 6,098,179 A | 8/2000 | Harter, Jr. |
| 6,108,713 A | 8/2000 | Sambamurthy et al. |
| 6,125,150 A | 9/2000 | Wesel et al. |
| 6,130,887 A | 10/2000 | Dutta |
| 6,130,894 A | 10/2000 | Ojard et al. |
| 6,151,296 A | 11/2000 | Vijayan et al. |
| 6,169,744 B1 * | 1/2001 | Grabelsky et al. ............ 370/447 |
| 6,182,147 B1 | 1/2001 | Farinacci |
| 6,188,717 B1 | 2/2001 | Kaiser et al. |
| 6,192,397 B1 | 2/2001 | Thompson |
| 6,202,082 B1 | 3/2001 | Tomizawa et al. |
| 6,215,792 B1 | 4/2001 | Abi-Nassif |
| 6,216,244 B1 | 4/2001 | Myers et al. |
| 6,222,851 B1 | 4/2001 | Petry |
| 6,243,386 B1 | 6/2001 | Chan et al. |
| 6,243,449 B1 | 6/2001 | Margulis et al. |
| 6,246,770 B1 | 6/2001 | Stratton et al. |
| 6,252,849 B1 | 6/2001 | Rom et al. |
| 6,259,696 B1 | 7/2001 | Yazaki et al. |
| 6,263,445 B1 | 7/2001 | Blumenau |
| 6,278,685 B1 | 8/2001 | Yonge, III et al. |
| 6,278,716 B1 | 8/2001 | Rubenstein et al. |
| 6,279,716 B1 | 8/2001 | Kayatani et al. |
| 6,289,000 B1 | 9/2001 | Yonge, III |
| 6,295,296 B1 | 9/2001 | Tappan |
| 6,334,185 B1 | 12/2001 | Hansson et al. |
| 6,343,083 B1 | 1/2002 | Mendelson et al. |
| 6,363,052 B1 | 3/2002 | Hosein |
| 6,370,156 B2 | 4/2002 | Spruyt et al. |
| 6,385,672 B1 | 5/2002 | Wang et al. |
| 6,397,368 B1 | 5/2002 | Yonge, III et al. |
| 6,421,725 B1 | 7/2002 | Vermilyea et al. |
| 6,430,192 B1 | 8/2002 | Creedon et al. |
| 6,430,661 B1 | 8/2002 | Larson et al. |
| 6,434,153 B1 | 8/2002 | Yazaki et al. |
| 6,442,129 B1 | 8/2002 | Yonge, III et al. |
| 6,456,649 B1 | 9/2002 | Isaksson et al. |
| 6,466,580 B1 | 10/2002 | Leung |
| 6,469,992 B1 | 10/2002 | Schieder |
| 6,473,435 B1 | 10/2002 | Zhou et al. |
| 6,480,489 B1 | 11/2002 | Muller et al. |
| 6,487,212 B1 | 11/2002 | Erimli et al. |
| 6,501,760 B1 | 12/2002 | Ohba et al. |
| 6,519,263 B1 | 2/2003 | Huth |
| 6,526,451 B2 | 2/2003 | Kasper |
| 6,538,985 B1 | 3/2003 | Petry et al. |
| 6,553,534 B2 | 4/2003 | Yonge, III et al. |
| 6,567,914 B1 | 5/2003 | Just et al. |
| 6,654,410 B2 | 11/2003 | Tzannes |
| 6,667,991 B1 | 12/2003 | Tzannes |
| 6,671,284 B1 | 12/2003 | Yonge, III et al. |
| 6,747,976 B1 | 6/2004 | Bensaou et al. |

| | | | |
|---|---|---|---|
| 6,751,231 B2 * | 6/2004 | Fellman et al. ............. | 370/437 |
| 6,765,885 B2 | 7/2004 | Jiang et al. | |
| 6,778,507 B1 | 8/2004 | Jalali | |
| 7,079,547 B2 * | 7/2006 | Lu et al. .................... | 370/463 |
| 2001/0012319 A1 | 8/2001 | Foley | |
| 2001/0043576 A1 | 11/2001 | Terry | |
| 2001/0048692 A1 | 12/2001 | Karner | |
| 2002/0001314 A1 | 1/2002 | Yi et al. | |
| 2002/0012320 A1 | 1/2002 | Ogier et al. | |
| 2002/0042836 A1 | 4/2002 | Mallory | |
| 2002/0048368 A1 | 4/2002 | Gardner | |
| 2002/0065047 A1 | 5/2002 | Moose | |
| 2002/0131591 A1 | 9/2002 | Henson et al. | |
| 2002/0191533 A1 | 12/2002 | Chini et al. | |
| 2003/0006883 A1 | 1/2003 | Kim et al. | |
| 2003/0079169 A1 | 4/2003 | Ho et al. | |
| 2003/0117984 A1 * | 6/2003 | Gavette ....................... | 370/338 |
| 2003/0174664 A1 | 9/2003 | Benveniste | |
| 2003/0217182 A1 | 11/2003 | Liu et al. | |
| 2003/0231652 A1 | 12/2003 | Sprague et al. | |
| 2003/0231658 A1 | 12/2003 | Liang et al. | |
| 2004/0001461 A1 * | 1/2004 | Lohtia et al. ................ | 370/331 |
| 2004/0001499 A1 | 1/2004 | Patella et al. | |
| 2004/0008728 A1 | 1/2004 | Lee | |
| 2004/0122994 A1 | 6/2004 | Hammitt et al. | |
| 2004/0184481 A1 | 9/2004 | Lee | |
| 2005/0129055 A1 * | 6/2005 | Hall et al. ................... | 370/461 |

FOREIGN PATENT DOCUMENTS

| | | | |
|---|---|---|---|
| WO | 98/57440 | | 12/1998 |
| WO | WO00/72495 | | 11/2000 |
| WO | WO/02/13443 | * | 2/2002 |
| WO | 02/41598 | | 5/2002 |

OTHER PUBLICATIONS

Sun et al., Public-key ID-based Cryptosystem, 1991, IEEE, pp. 142-144.

Bruschi, Danilo, Secure Multicast in Wireless Networks of Mobile Hosts: Protocols and Issues, 2002, Mobile Networks and Applications, pp. 503-511.

IBM, Combined use of collision resolution and collision avoidance MAC protocols, Oct. 1, 1994, IBM Technical Disclosure Bulletin, vol. 37, pp. 299-302 (NN9410299).

ISO/IEC 8802-3: 2002 International Standard (ANSI/IEEE Std 802.3) Carrier sense multiple access with collision detection (CSMA/CD) access method and physical layer specifications.

ISO/IEC 8802-11: 1999 International Standard (ANSI/IEEE Std 802.11) Wireless LAN Medium Access Control (MAC) and Physical Layer (PHY) specifications.

Shared Wireless Access Protocol (Cordless Access) Specification, SWAP-CA Revision 1.21, Jan. 27, 1999, by the HomeRF™ Technical Committee.

Interface Specification for HomePNA™ 2.0—10M8 Technology, Dec. 1, 1999.

Interface Specification for HomePNA™ 2.0—10M8 Technology—Link Layer Protocols, Dec. 1, 1999.

Bux, "Token-Ring Local-Area Networks and Their Performance," Procs. Of the IEEE, vol. 77, No. 2, Feb. 1989.

Applied Cryptography, Second Edition: protocols, algorithms, and source code in C, Bruce Schneier, 1996.

PKCS #5 v. 20: Password-Based Cryptography Standard, RSA Laboratories, Mar. 25, 1999.

HomePlug Powerline Alliance, HomePlug 1.0.1 Specification, Dec. 1, 2001.

Lee et al., "HomePlug 1.0 powerline communication LANs—protocol description and performance results", Int. J. Commun. Syst., vol. 16 (2003).

Carrier sense multiple access with collision detection (CSMA/CD) access method and physical layer specifications, ISO/IEC 8802-3: 1996 International Standard (ANSI/IEEE Std 802.3).

Bertsekas et al., Data Networks, Prentice Hall, Englewood Cliffs, NJ, Section 2.4.3 Selective Repeat ARQ (1992).

HiPerformance Radio Local Area Network (HiperLAN) Type I: Functional Specification, European Standard (Telecommunication Series) No. 300652 V. 1.2.1 Jul. 1998.

An Architecture for Differentiated Services, IETF RFC 2475, Dec. 1998.

Goalic et at.,"Real-Time Turbo-Decoding of Product Codes on a Digital Signal Processor," IEEE, pp. 624-628 (1997).

Benedetto et al., "A Soft-Input Soft-Output Maximum A Posteriori (MAP) Module to Decode Parallel and Serial Concatenated Codes," TDA Progress Report 42-127, pp. 1-20 (Nov. 1996).

Peterson et al., "Error-Correcting Codes," The MIT Press (1972).

Pyndiah, "Near-Optimum Decoding of Product Codes: Block Turbo Codes," IEEE Transactions on Communications, vol. 46, No. 8, pp. 1003-1010 (Aug. 1998).

Pyndiah, "Near Optimum Decoding of Product Codes," IEEE, pp. 339-343 (1994).

Pyndiah, "Performance of Block Turbo Coded 16-QAM and 64-QAM Modulations," IEEE, pp. 1039-1043 (1995).

Ehrsam et al., "A cryptographic key management scheme for implementing the Data Encryption Standard," IBM Syst J, vol. 17, No. 2 (1978).

Kamerman, A; Aben, G; Net throughput with IEEE 802.11 wireless LANs; Wireless Communications and Networking Conference, 2000. WCNC 2000 IEEE, vol. 2, Sep. 23-28, 2000; pp. 747-752.

Dube, P.; Altman, E.; Queueing analysis of early message discard policy; Communications, 2002. ICC 2002. IEEE International Conference, vol. 4, Iss., 2002, pp. 2426-2430.

* cited by examiner

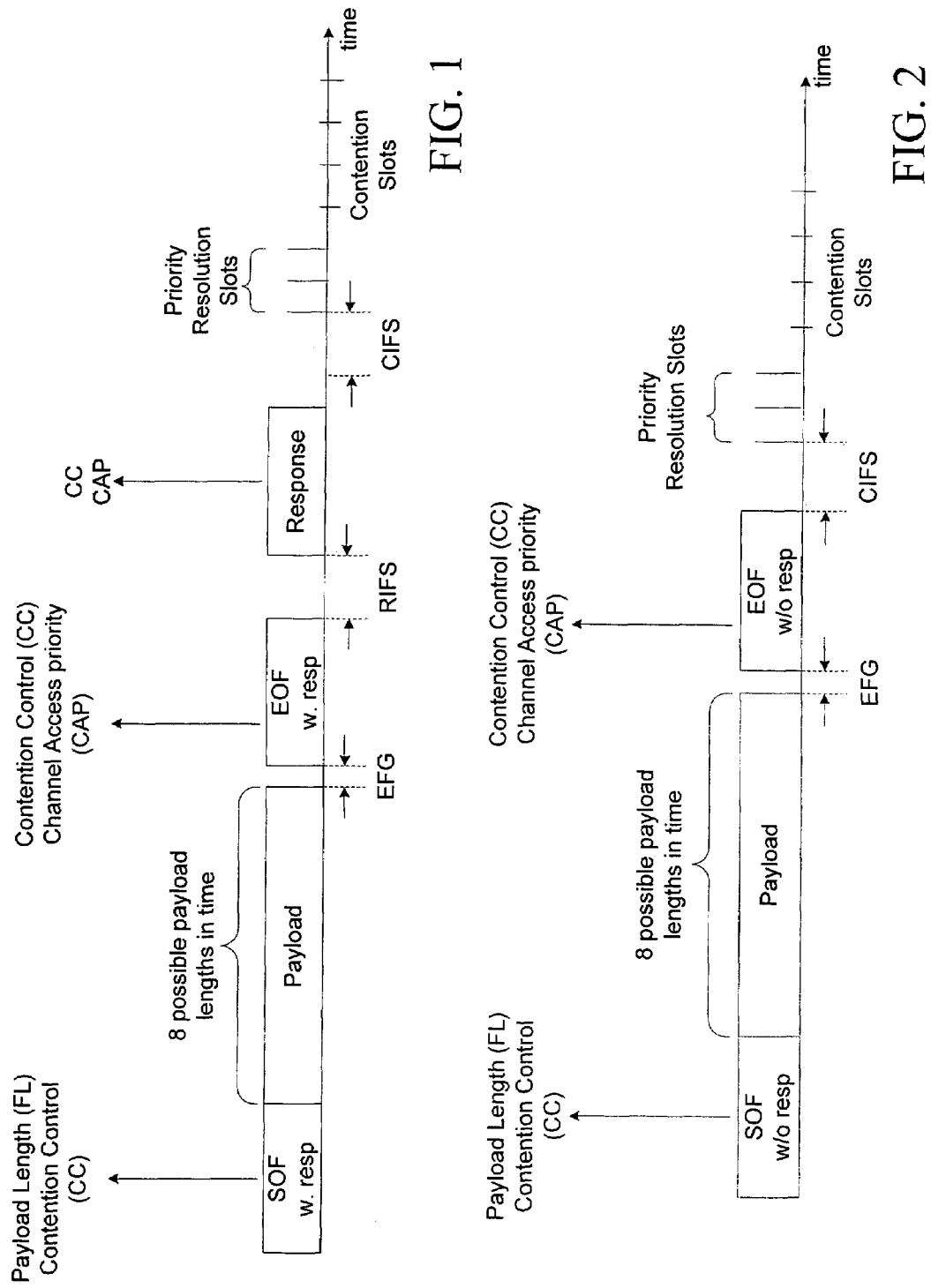

TEMPORARY PRIORITY PROMOTION FOR NETWORK COMMUNICATIONS IN WHICH ACCESS TO A SHARED MEDIUM DEPENDS ON A PRIORITY LEVEL

TECHNICAL FIELD

This invention relates to medium access control (MAC) protocols, particularly in power line data communication.

BACKGROUND

Data communication is presently conducted over AC power lines within homes using the HomePlug 1.0 specification, which uses the well-known carrier sense multiple access with collision avoidance (CSMA/CA) technique for medium sharing. Using this mechanism, a station senses the medium to determine if the medium is busy. If the medium is determined to be idle, the transmission may proceed. If the medium is busy, the transmission should defer until the end of current transmission. After the end of current transmission, stations go through a priority resolution process in the priority resolution slots. The result of the priority resolution process is that stations with the highest priority in the network will contend in the contention resolution slots while other stations defer from accessing the medium. Proper operation of the HomePlug 1.0 protocol requires that all station properly determine the start of the priority resolution period. This is achieved by using the broadcast information contained in the frames, which the HomePlug 1.0 specification refers to as the MAC protocol data units (MPDUs).

Payload is exchanged between HomePlug 1.0 stations using what the specification calls a Long MPDU. A Long MPDU consists of a Start of Frame (SOF) delimiter, Payload, End of Frame Gap (EFG) and End of Frame (EOF) delimiter. A long MPDU can support eight different payload lengths. The SOF delimiter indicates whether a response is expected, the frame length (FL) and Contention Control (CC) Information. The EOF delimiter indicates whether a response is expected, Contention Control (CC) and Channel Access priority (CAP) information. HomePlug 1.0 stations use a Response delimiter to transmit MAC level acknowledgments. The Response delimiter indicates the type of response (ACK, NACK or FAIL), Contention Control (CC) and Channel Access priority (CAP) information.

FIG. 1 shows the activity on the medium when a Long MPDU with response expected is transmitted. The Response delimiter appears a prescribed duration—known as the Response Interframe Space (RIFS) duration—after the transmission of the Long MPDU. The Response delimiter is followed by a Contention Interframe Space (CIFS) and the priority resolution slots (PRS). Priority resolution slots are followed by contention slots.

FIG. 2 shows the activity on the medium when a Long MPDU with no response expected is transmitted. In this case, the Long MPDU is followed by a contention interframe space (CIFS) and the priority resolution slots (PRS), which are followed by contention slots.

The information contained in various delimiters (e.g., the Long MPDU and the Response) along with the knowledge of various interframe spacing is used by HomePlug 1.0 stations to determine the start time of the priority resolution slots.

HomePlug 1.0 stations process packets received from higher layers and transfer them to the desired destination(s) using Long MPDUs. If a packet cannot fit in a single Long MPDU, the packet is segmented and each segment is transmitted using a Long MPDUs. One important aspect of HomePlug 1.0 protocol is Segment Bursting. Segment Bursting allows a station to transmit MPDUs carrying segments of a packet in a single burst using a contention free access mechanism of HomePlug 1.0. The contention free access mechanism can also be to transmit multiple packets in a single burst.

The contention free access mechanism uses the CC and CAP priority information broadcast in the delimiters. Using this mechanism, a station that has multiple segments pending sets the CC to 0b1 and CAP to the packet priority in the first MPDU. For Long MPDUs that require a response, the receiver repeats the received CC and CAP in the Response delimiter. When stations detect a transmission with CC set to 0b1, they defer from priority resolution and subsequent contention if their traffic has a priority of less than or equal to CAP. Thus, the station continues to transmit the remainder of the MPDUs with CC set to 0b1. The last MPDU in the burst is transmitted with CC set to 0b0, thus allowing other stations to access the medium.

Although HomePlug 1.0 based systems are widely used, they are not ideal for supporting multimedia applications. This is due to the uncontrolled nature of channel access in HomePlug 1.0 networks makes it difficult to support quality of service (QoS) guarantees. QoS can be evaluated in terms of latency, jitter, and packet loss probability (PLP), where latency is how much time it takes for a packet of data to get from one device to another, jitter is a random variation in the delay between the arrival of one packet of data and a consecutive packet of data, and PLP is a probability of losing a packet of data transmitted from one device to another device. Other protocols that can support QoS over AC power lines can be hampered in the presence of HomePlug 1.0 legacy stations in the network. HomePlug 1.0 based systems also suffer from poor network performance resulting from segment bursting. Since segment bursting is common at low data rates, these connections use most of the time available. This unfair access can reduce the network throughput.

SUMMARY

In general the invention features a method of operating in a network in which a plurality of stations communicate over a shared medium (e.g., using a carrier sense multiple access (CSMA) service). The stations contend for access to the shared medium using a contention procedure that relies on a priority level, wherein transmissions with a lower priority level have a reduced chance of gaining access to the shared medium during a contention process. Selected stations are given the capability of temporarily promoting the priority level of transmissions they are attempting to make. The priority level is increased during an interval to reduce the chance that other stations gain access to the shared medium during that interval, and the priority level is restored to its normal level following the interval.

Preferred implementations of the invention may incorporate one or more of the following. The promoted priority level may be used to interrupt burst traffic. The priority level may be restored to the normal level for contention following the interrupted burst. The promoted priority level may be used not to interrupt burst traffic but to reduce the chance that some stations gain access to the shared medium. Priority may be promoted by a station under predefined circumstances. The predefined circumstances may include detection that another station is using a robust transmission protocol of a type indicative of a low transmission rate. The predefined circumstance may include that another station is sending a burst transmission. The predefined circumstances may include that the burst transmission has continued uninterrupted for more than a defined number of frames. The selected stations may use the same communication protocol as the other stations. The selected stations may employ a QoS guarantee protocol and the other stations may be legacy stations lacking a QoS guarantee protocol. The station transmitting the burst may follow a protocol that requires the station to interrupt a burst transmission if a higher priority level is asserted in priority resolution slots between frames, and the selected stations may be capable of increasing the priority that they assert in the priority resolution slots to interrupt the burst transmission. The selected station asserting a temporarily promoted priority may have data to transmit. The selected station asserting a temporarily promoted priority may not have data to transmit. The selected station may assert the promoted priority in order to assist other stations by increasing the likelihood that stations will see the promoted priority and refrain from transmission. The selected station may employ a QoS guarantee protocol that transmits QoS traffic during regularly repeated contention free intervals, and by asserting the promoted priority the station may increase the likelihood that other stations do not attempt to transmit during the regularly repeated contention free intervals.

In another aspect, the invention features a method of operating in a network in which a plurality of stations communicate over a shared medium (e.g., using a carrier sense multiple access (CSMA) service). The plurality of stations include at least one legacy station that uses a legacy contention protocol not suited for quality of service guarantees. A second plurality of stations use a second contention protocol different from the legacy contention protocol and suited for providing a quality of service guarantee. The legacy station transmits a burst of frames without halting for contention between frames, by asserting a contention-free signal in a frame delimiter and by asserting a priority level in priority resolution slots between frames, and the burst is only halted if another legacy station asserts a higher priority level in the priority resolution slots. At least one of the second plurality of stations asserts a promoted priority level during the priority resolution slots to interrupt the burst transmission of the legacy station and a normal priority during contention following interruption of the burst transmission.

Implementations may include one or more of the following features. There may be two priority resolution slots, and a total of four priority levels may be asserted using the two slots. The use of a promoted priority level may occur after the burst transmission has spanned more than a defined number of frames.

The invention is able to prevent one or more legacy (e.g., HomePlug 1.0) stations from accessing the medium. Using this mechanism, station(s) can asserts priority signals in the PRS slots to interrupt an on going legacy burst transmission or to prevent any legacy station from accessing the medium (whether by burst or otherwise). In some circumstances, a station may use the invention to interrupt legacy station transmissions even when the station has no traffic pending (e.g., to better assure that all legacy stations are prevented from transmitting during a regularly repeated contention free interval used for QoS guaranteed traffic).

Segment bursting by HomePlug 1.0 stations tends to be more common on poor channels, and thus can significantly degrade the network throughput. Using the invention, a segment burst can be interrupted by asserting a priority higher than the priority of the segment burst.

Other features and advantages of the invention will be apparent from the drawings, the detailed description, and the claims.

DESCRIPTION OF DRAWINGS

FIG. 1 is a depiction of a data frame transmission when a long MPDU is transmitted with a Response delimiter expected.

FIG. 2 is a depiction of a data frame transmission when a long MPDU is transmitted without a Response delimiter expected.

DETAILED DESCRIPTION

There are a great may possible implementations of the invention, too many to describe herein. Some possible implementations that are presently preferred are described below.

We begin with a description of the operation of HomePlug 1.0 stations, with which some implementations of the invention are designed to operate.

Operation of HomePlug 1.0 Stations

Figure 6A:
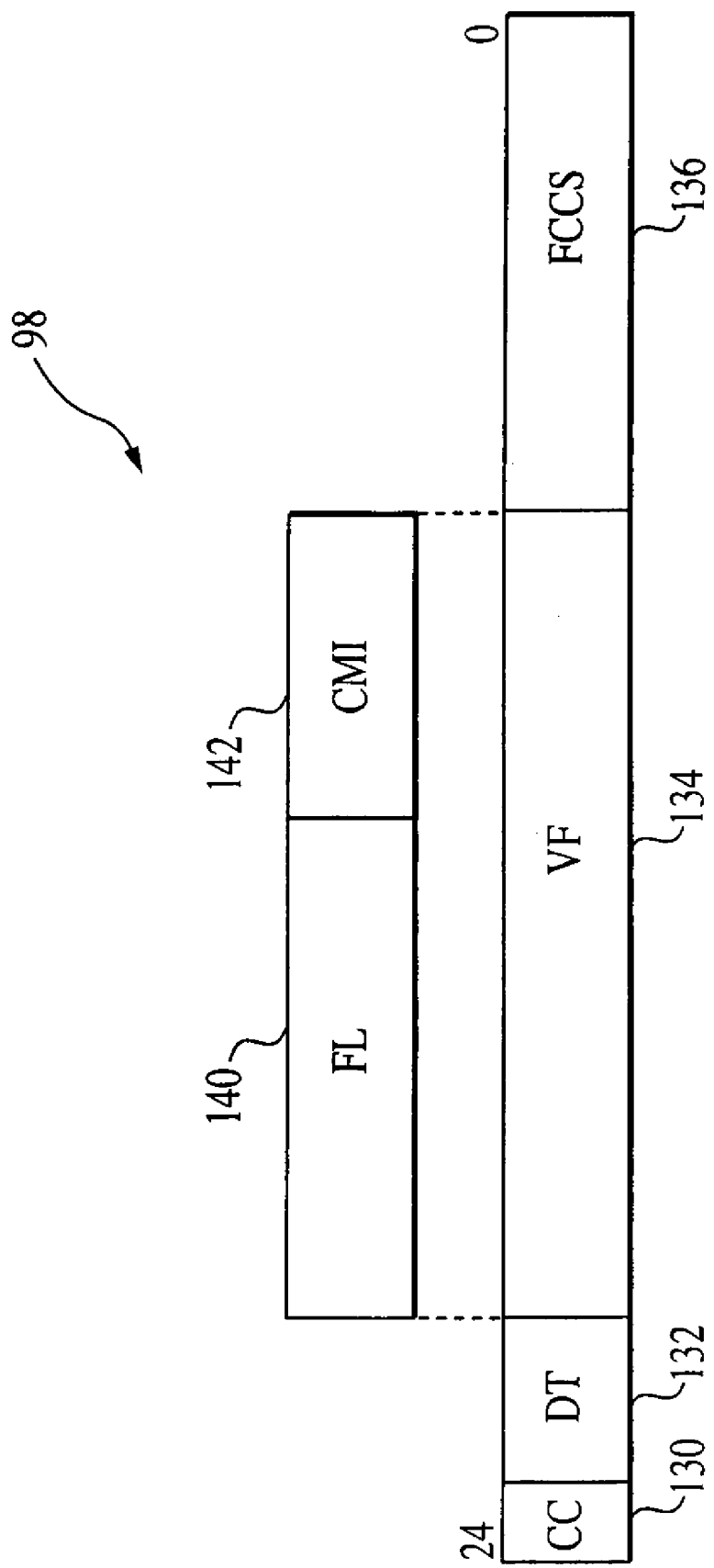
FIG. 6A is a depiction of the format of a frame control field in the start delimiter
Figure 6B:
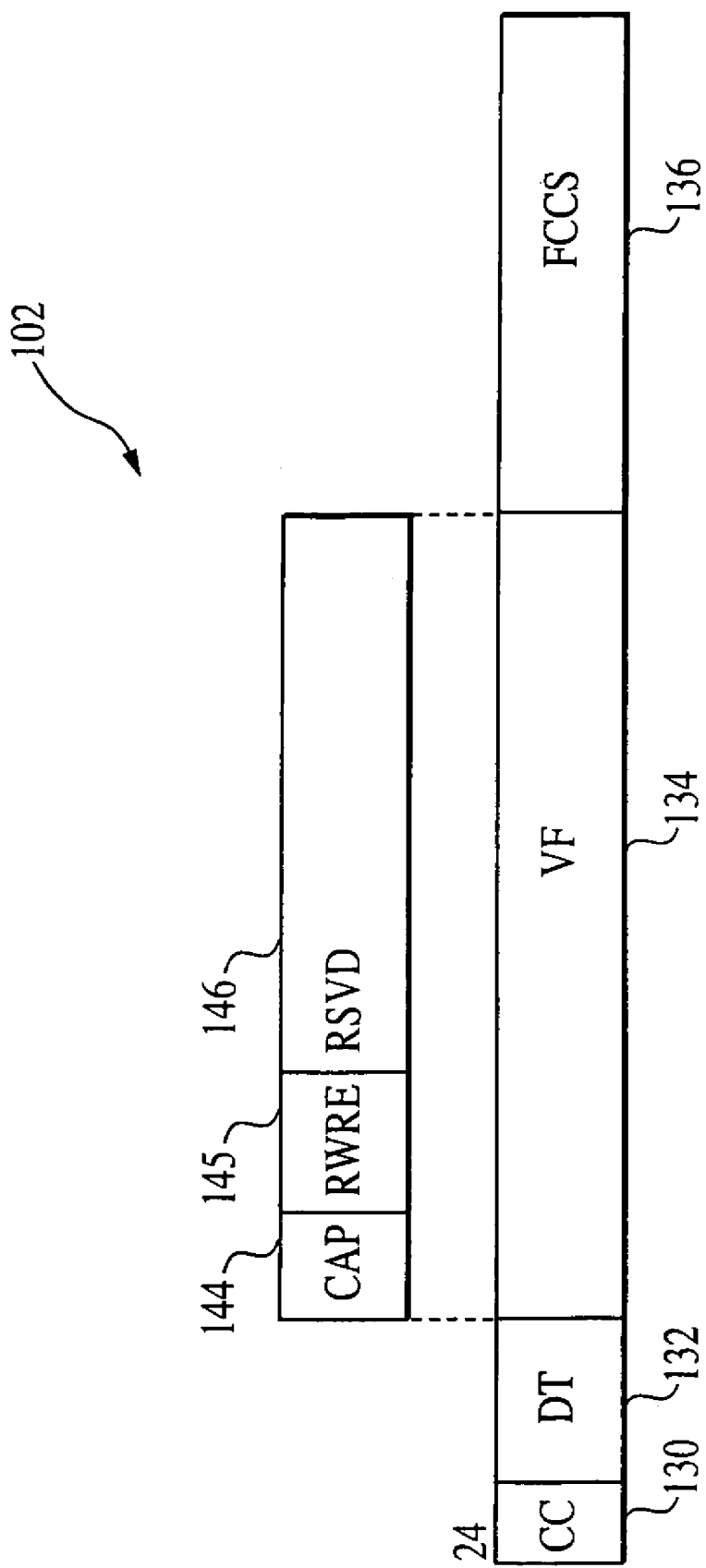
FIG. 6B is a depiction of the format of a frame control field in the end delimiter.
Figure 7:
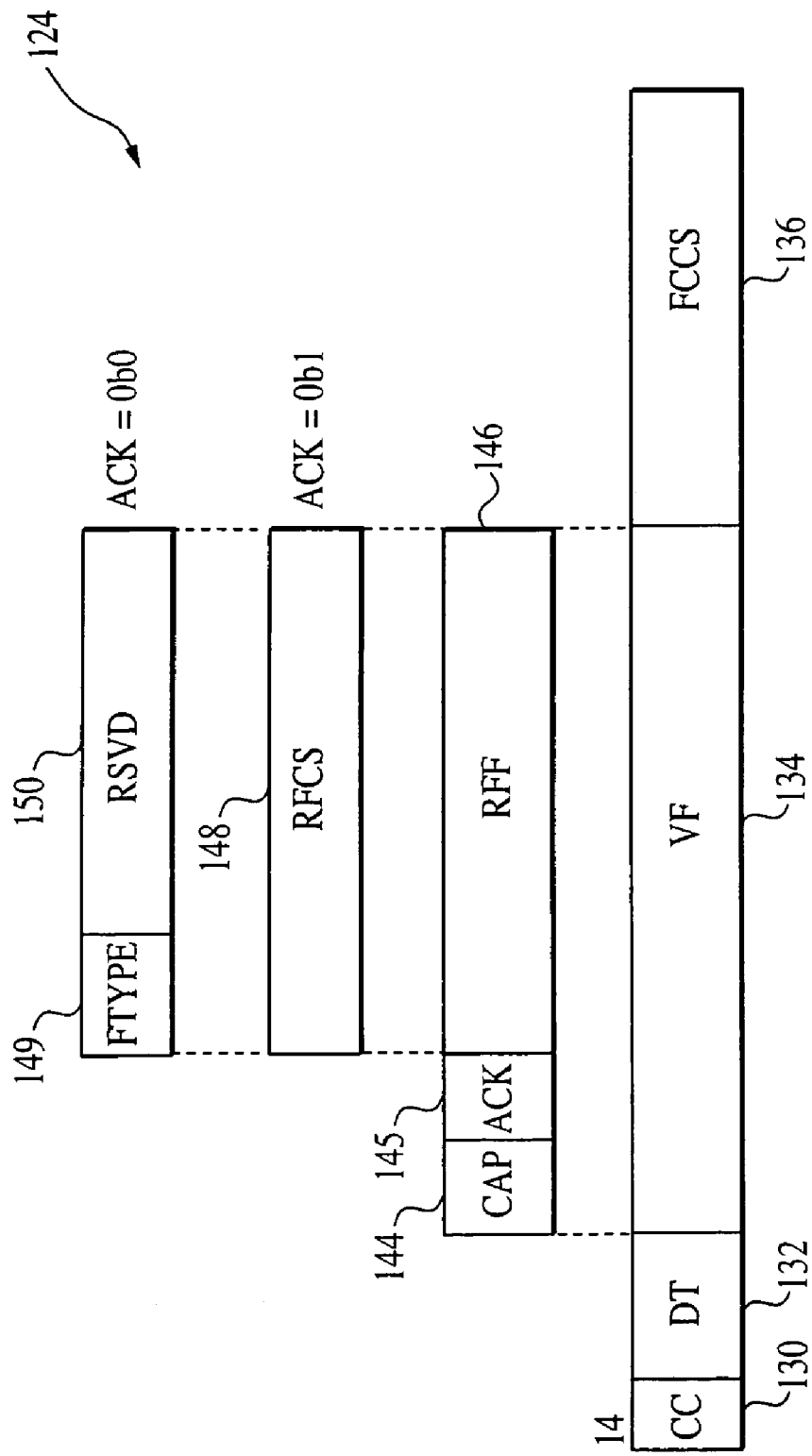
FIG. 7 is a depiction of the format of a frame control field in the response delimiter.

FIGS. 6A and 6B depict the bit field definition of the frame control field 98 and the frame control field 102, respectively. Referring to FIG. 6A, the frame control field 98 includes a Contention Control (CC) field 130, a Delimiter Type (DT) 132, a Variant Field (VF) 134 and a Frame Control Check Sequence (FCCS) field 136. The Contention Control indicator bit 130 is observed by all stations and indicates whether the next contention period (or "window") is contention-based or is contention-free with respect to all but pending frames of a higher priority. For a CC=1, indicating contention-free access, contention is allowed only if the priority of a pending frame is higher than the priority of the frame containing the set CC bit. If CC=0, indicating contention-based access, contention is allowed in the next contention window. The Delimiter Type field 132 identifies the delimiter and its position relative to the frame with which it is associated. For a start delimiter, the Delimiter Type may have one of two values, a value '000', interpreted as a Start-of-Frame (SOF) with no response expected, or a value '001', interpreted as an SOF with a response expected. For a delimiter of either of the start delimiter types, the Variant Field 134 includes an 8-bit Frame Length (FL) 140 and a 5-bit Channel map Index (CMI) 142, which are used by the PHY device in a receiving station to decode a received frame payload. The Frame Control Check Sequence (FCCS) field 136 includes an 8-bit Cyclic Redundancy Check (CRC). The FCCS is computed as a function of the sequence starting with the CC bit and ending with the VF bits.

Referring to FIG. 6B, the frame control field 102 includes the same general field format, that is, it includes the fields 130, 132, 134 and 136. The DT field may have one of two values, a value of '010' corresponding to an End-of-Frame (EOF) with no response expected, or a value of '011' corresponding to an EOF with a response expected. For either of these end delimiter types, the Variant Field 134 includes a two-bit Channel Access Priority (CAP) 144, a 1-bit Response With Response Expected (RWRE) field 145 and a ten-bit Reserved field (RSVD) 146. The CAP field 144 indicates a priority level associated with the current segment, information that is used by all stations in the network to determine if a multiple-segment transmission or burst (for which the CC bit is typically set), can be interrupted. The RWRE field 145 is used to indicate that two responses are to follow. The Reserved field 146 is set to zero by the transmitter and ignored by the receiver.

Referring again to FIG. 6A, it will be appreciated that the start delimiter's frame control field 98 may be defined differently (e.g., different field lengths, fields added or omitted). For example, if the end delimiter is not to be used, then it may be desirable to use the available bits to include additional information, such as the CAP field 144 (shown in the frame control field 102 in FIG. 6B), in the frame control field 98 of the start delimiter 92.

Figure 8A:
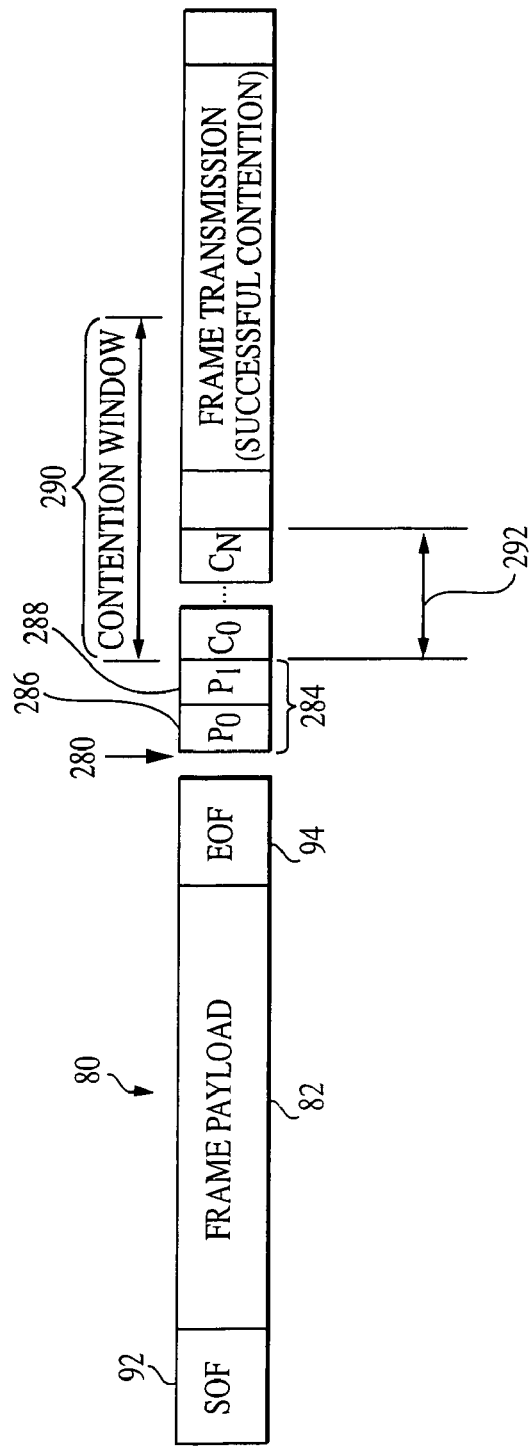
FIGS. 8A and 8B are depictions of data frame transmissions utilizing priority and contention-based access (FIG. 8A) and priority and contention-free access (FIG. 8B).

Referring to FIGS. 8A-8D, a medium sharing technique that utilizes priority resolution and contention following busy conditions on the channel is shown. A Contention Interspace Frame Space (CIFS) 280 defines the interframe spacing between the end of the last correctly received frame transmission for which no response is expected and the start of a Priority Resolution Period (PRP) 284, which is used to resolve priority for new transmissions. Referring to FIG. 8A, a last frame transmission is in the form of the data frame transmission 80. The Priority Resolution Period 284 includes a first Priority Resolution Slot P0 286 and a second Priority Resolution Slot P1 288. There are four levels of Channel Access Priority (CAP): the highest priority is indicated by CA3=0b11 and the lowest priority is indicated by CA0=0b00. Table 3 below maps the CAP to the Priority Resolution Slots 286 and 288.

TABLE 3

| Channel Access Priority | P0 State | P1 State |
|---|---|---|
| CA3 | 1 | 1 |
| CA2 | 1 | 0 |
| CA1 | 0 | 1 |
| CA0 | 0 | 0 |

The current version of IEEE 802.1 standard describes the use of user priorities and access priorities in a bridged network environment. User priorities are priorities that a user of application requests be associated with its traffic. Access priorities are the number of differentiated traffic classes that a MAC provides. The subclause 7.7.3, 802.1D provides a mapping of user priorities to traffic classes. The five differentiated traffic classes discussed herein, i.e., those corresponding to the four channel access priorities (CA0 through CA3), and the contention free access, correspond, one to one, to traffic classes 0 through 4.

Still referring to FIG. 8A, the intention to contend at a particular priority during a Contention Window 290 after a random backoff interval 292, which is expressed in terms of Contention Resolution Slots C0, . . . ,CN, is signaled in the Priority Resolution Period 284 as follows. A station that requires access to the channel determines if the delimiter received immediately prior to the PRP 284 (in the example, the EOF delimiter 94, also shown in FIG. 6B) included in its frame control field a set Contention Control bit 130 and specified in the CAP field 144 a priority greater than or equal to the priority that would have otherwise been indicated by the station in the PRP 284. If so, the station refrains from indicating an intention to contend in the current PRP. Instead, the station updates the value of the VCS and waits the duration of an Extended Interframe Space (EIFS) or until it detects the end of the next transmission, whichever occurs first.

Figure 8B:
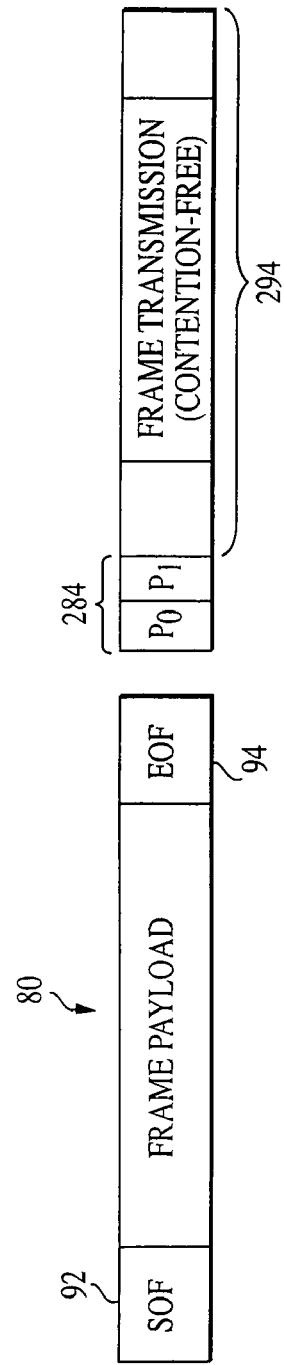

FIG. 8B illustrates an exemplary contention-free frame transmission 294 immediately following the PRP 284. In this example, contention-free status has been established by the station that sent the data frame transmission 80 by using a set Contention Control bit 130 in the delimiter 92 and winning contention during a prior Contention Window 290.

Otherwise, and referring back to FIG. 8A, the station signals its priority during the PRP 284. During P0 286, the station asserts a Priority Resolution Symbol if the priority requires a binary one in slot 0 (i.e., CA3 or CA2). Alternatively (if a lower priority), the station detects if a Priority Resolution Symbol was transmitted by another station. During P1 288, if the station signaled in the last slot and the station's priority requires that the station signal in this slot, it does so. If the station signaled in the P0 slot 286 and not the P1 slot 288 but detects (during the P1 slot 288) that another station is signaling in this slot, it defers to the higher priority station and refrains from transmitting during the Contention Window 290. The station also sets the VCS with an appropriate value (according to rules to be described later). If the station did not signal in the P0 slot 286 and detected that other stations did, it refrains from transmitting in the P1 288 or transmitting in the Contention Window 290. Again, it sets VCS with an appropriate value. Thus, the station refrains from transmitting in any remaining one of the slots 286, 288 or the Contention Window 290 if it has detected a Priority Resolution Symbol in a one of the slots 286, 288 in which the station did not assert the signal. In this manner, each station determines the highest-level priority for which there is a transmission pending and defers if its own pending transmission is of a lesser priority. If priority signaling has been completed and the station has not been pre-empted by a higher priority, it contends for access in a Contention Window 290 according to a backoff procedure, as will be described.

Figure 8C:
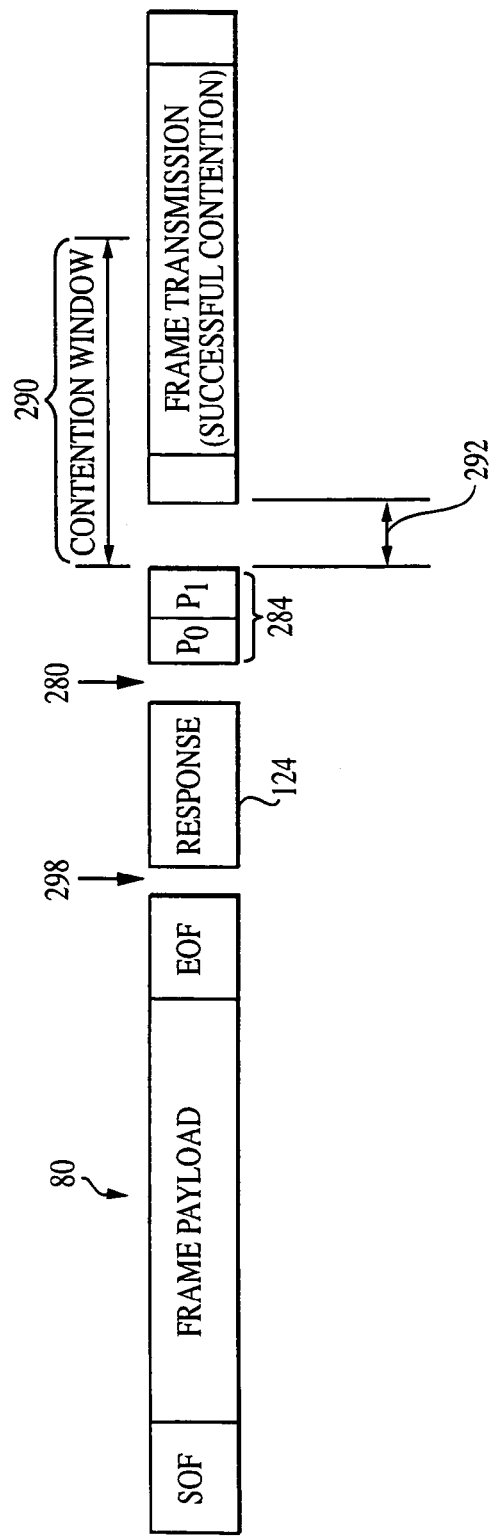
FIGS. 8C and 8D are depictions of response frame transmissions utilizing priority and contention-based access (FIG. 8C) and priority and contention-free access (FIG. 8D).

Referring to FIG. 8C, if the last data transmission 80 requires and is followed by a response 124, the station waits a Response Interframe Space (RIFS) 298, the time between the end of the data frame transmission 80 and the start of the associated response 124. The CIFS 280 follows the response 124. Many protocols assign the shortest interframe space to Responses so that channel ownership is maintained by the stations involved in the exchange. The MAC uses information in the frame header to notify stations whether a response is expected. If no response is expected, the CIFS is in effect.

Figure 8D:
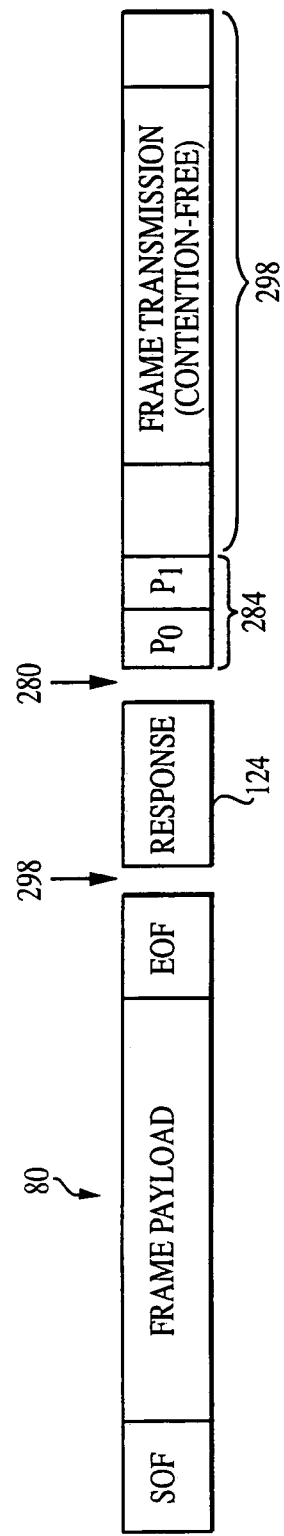
Figure 9:
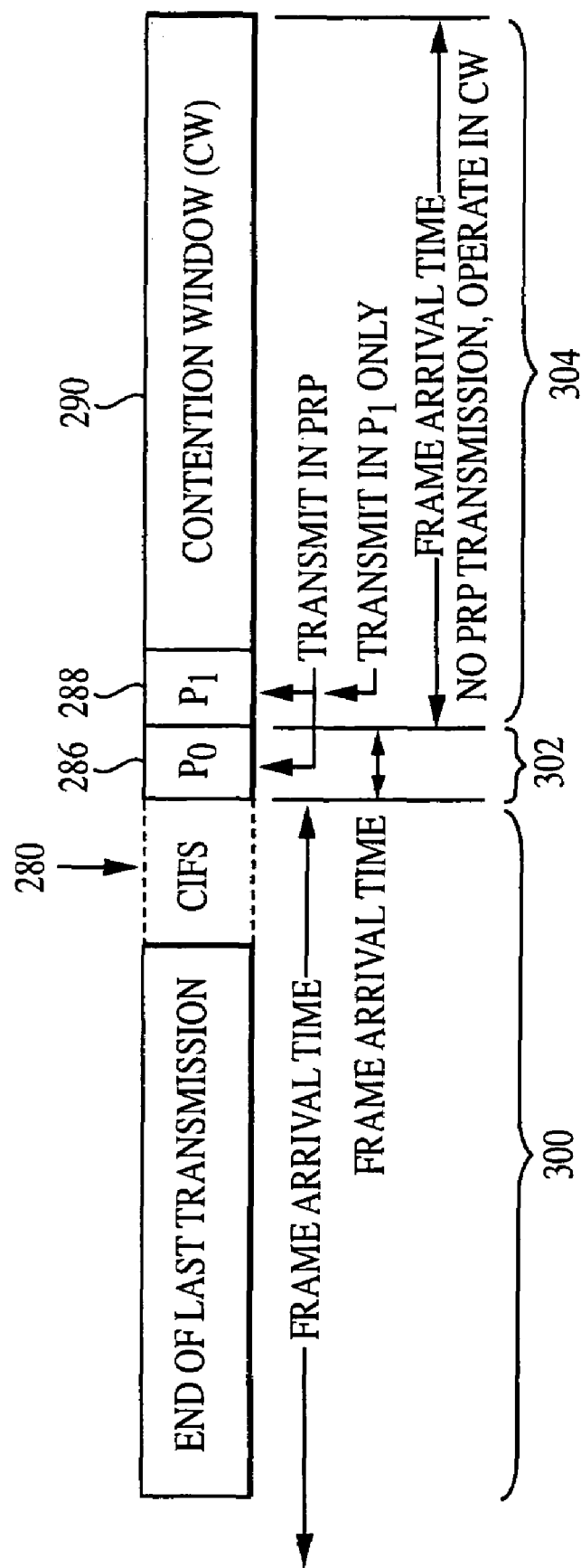
FIG. 9 is a depiction of priority and contention resolution slot signaling based on the arrival time of the frame to be transmitted.

FIG. 8D illustrates an exemplary contention-free transmission that occurs after a response. In this example, contention-free status has been established by the station that sent the last data transmission 80 with a set Contention Control bit (thus causing the return of the response 124 with a set Contention Control bit) and winning contention during a prior Contention Window 290.

The above-mentioned Extended Interframe Space (EIFS) is calculated by adding the PRP, the CIFS and the RIFS to the maximum frame time (i.e., the maximum allowed frame length and delimiter(s)) in symbols, times the symbol time) and the response time (response length in symbols times the symbol time). The EIFS is used by a station when a contention free access cannot be interrupted (as discussed above). It is also used when the station does not have complete knowledge of the state of the medium. This condition may occur when the station hears only one side of a frame exchange between two other stations, when the station initially attaches to the network, or when errors in the received frames make them impossible to decode unambiguously. The EIFS is significantly longer than the other interframe spaces, providing protection from collision for an ongoing frame transmission or segment burst when any of these conditions occur. If the medium has been idle for the minimum EIFS, no channel access contention is necessary and the frame may be transmitted immediately.

Referring back to FIGS. 8A and 8C, the station generates the random backoff time 292 to create an additional delay, unless backoff is already in effect and no new random value is needed. Backoff time is defined as:

$$BackoffTime = Random(\ ) * SlotTime \quad (1)$$

where Random( ) is a uniformly distributed pseudorandom integer from the interval [0, ContentionWindow], the ContentionWindow (CW) value varying from a minimum value of seven (7) to a maximum value of 63, and SlotTime defined as a predetermined slot time. A station entering the backoff procedure sets its Backoff Time as described above.

An MSDU arriving at the MAC unit 18 is placed in one or more segments depending on the size of the MSDU and the data rate the link will sustain. Every effort is made to transmit all of the segments of a single MSDU in a single, continuous burst of MAC frames. Acknowledgments and retransmissions occur independently for each segment.

When an MSDU is segmented into a number of segments, the segments are sent in a single burst, if possible, to minimize the demands on the receiver resources and maximize the throughput of the network, while still taking into account latency response and jitter performance. Segment bursting is accomplished by using the Contention Control and Channel Access Priority fields in the Frame Control, as discussed earlier with reference to FIG. 6B. A segment burst may be pre-empted by a station with a transmission of a higher priority.

When sending a segment burst, a station contends for the medium in the normal fashion, that is, in the manner described above. Once the station has control of the medium, it sets the Contention Control bit to 0b1, inserts the priority of the MSDU (to which the segment belongs) into the Channel Access Priority field of the Frame Control and transmits the segments in a burst without further contending for the medium with stations having transmissions of the same or lower priority. The station defers to transmissions having a higher priority that are indicated in the priority resolution period following the transmission of every segment. In the last segment of the MSDU, the station clears the Contention Control Bit to 0b0 in the Frame Control before transmitting the segment to allow normal contention by all stations in the PRP following the conclusion of the transmission.

If a station receives a transmission request for a frame of a higher priority than the priority of the segment burst that is occupying the medium, it contends for the medium in the PRP immediately following the transmission of the current segment. If the segment burst is pre-empted by a higher priority pending frame, the station that had been performing the segment bursting contends for the medium to resume the segment burst. The station resumes the segment burst when it has regained control of the medium.

Thus, segment bursting provides a single station control of the medium at a given priority level. By assuming the highest priority level (CA3), a station may preclude any other station from accessing the medium for the duration of the segment burst and the segment burst can proceed uninterrupted. Because bursting at the CA3 priority level blocks higher priority traffic (i.e., contention-free traffic) and thus impacts QoS, however, it is desirable to place restrictions on the use of the CA3 priority level. For example, the CA3 level could be restricted to contention-free transmissions only. Alternatively, segment bursting could be restricted to priority levels CA0 through CA2, as well as CA3 (for contention-free traffic only).

Like priority, latency plays a critical role in frame delivery performance for QoS. Moreover, poor latency characteristics can have an adverse impact on frame delivery performance at a specified priority level. One way to limit this impact is to bound latency in some manner. In the described embodiment, the length of frames is limited to ensure that any transmission occupies the medium for no longer than a predetermined time threshold, e.g., 2 ms. Preferably, for maximum performance at the highest priority level, the highest priority level traffic is excluded from the frame length restriction or subject to a more relaxed limit. Alternatively, however, for ease of implementation, all levels could be subject to the frame length limit restriction. Another way to bound latency and thus improve delivery performance is to limit segment bursts under certain conditions (for example, in the manner discussed above, so that a segment burst can be interrupted by a higher priority class of traffic).

The PHY Frame Transmit Process 336 initiates a transmission or transmission attempt using Channel Contention with priority as discussed above. The PHY Frame Transmit Process 336 is shown in FIGS. 23 through 25.

Figure 10:
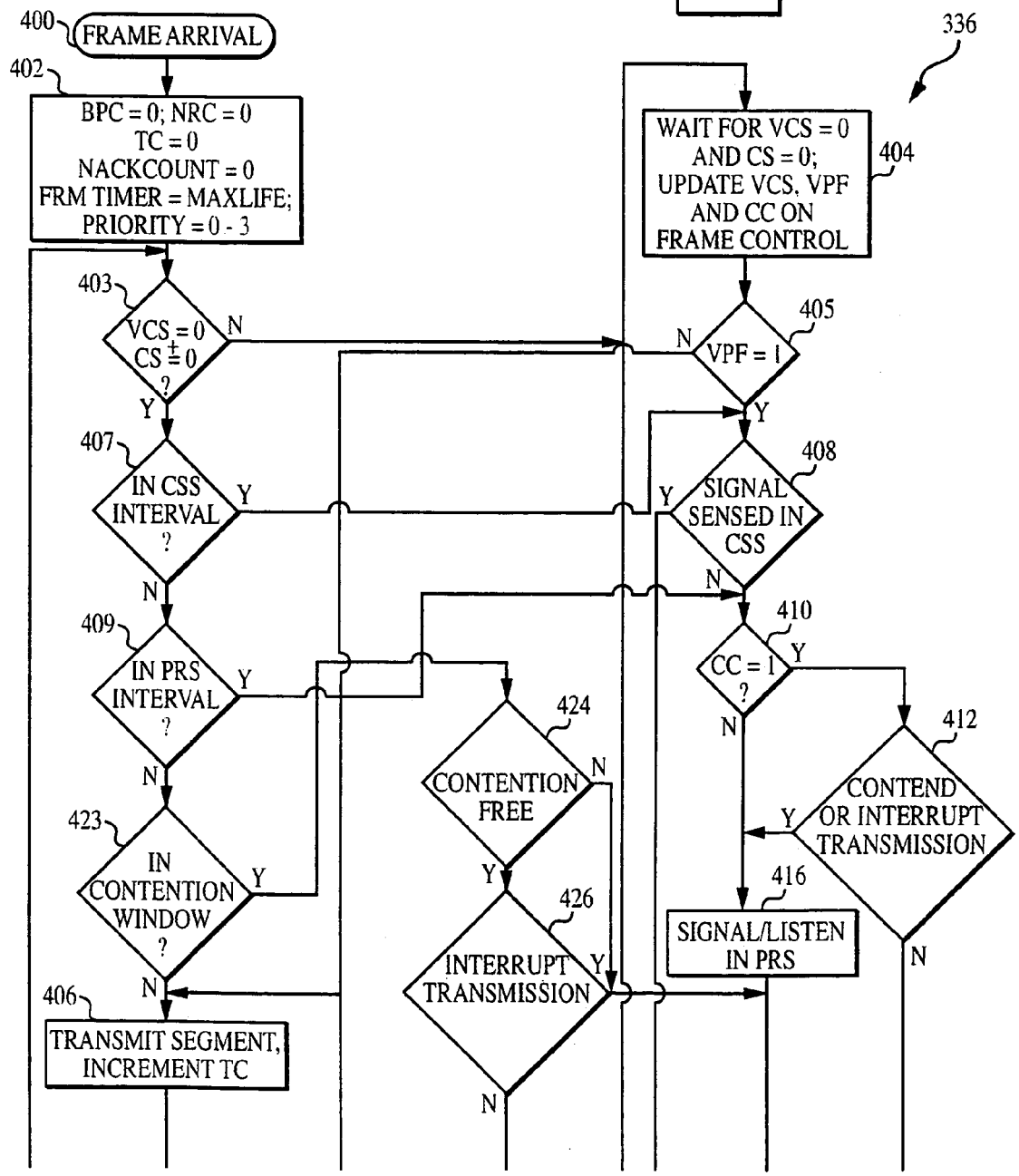
FIG. 10 is a flow diagram of a frame transmit process.
Figure 10B:
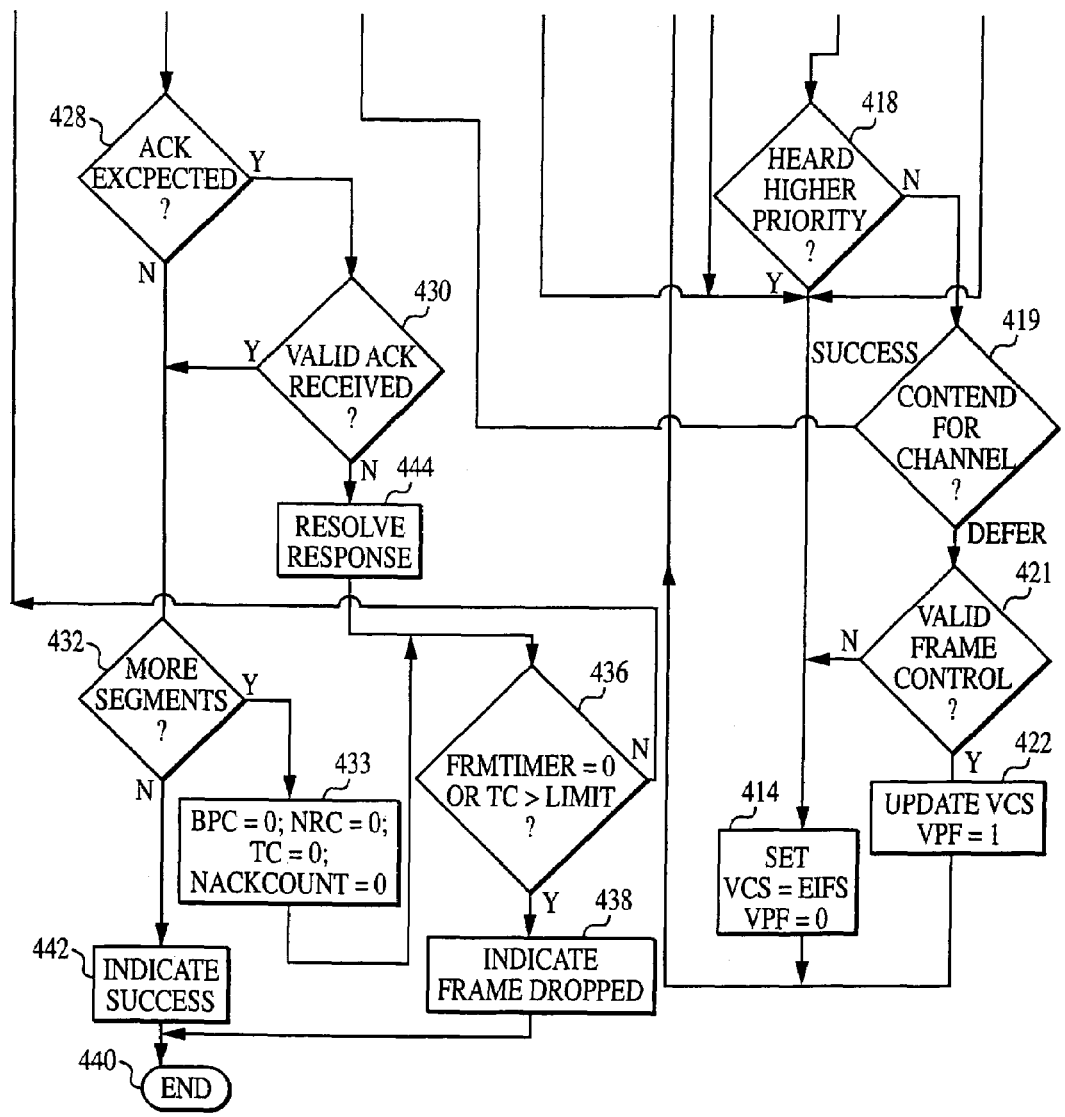

Referring to FIG. 10, the PHY Frame Transmit process 336 begins with the arrival of a frame to be sent over the transmission medium (step 400). The transmitter initializes control for maintaining timing information and priority (step 402). The timing information includes the counts maintained by the Backoff Procedure Count (BPC), the Transmit counter (TC), the NACK counter (NACKcount) and the No Response counter (NRC), each of which is set to a zero value. The timing information further includes the timer corresponding to the transmit lifetime value, FrmTimer. The FrmTimer is set to a maximum value (MaxLife) as a default unless a lifetime value is passed down to the MAC unit by the LLC unit. The priority is set to the value of the channel access priority assigned to the frame. The transmitter detects if the medium is busy by determining if the values of the VCS and CS are equal to zero (step 403). If these values are non-zero, that is, the medium is busy, the transmitter waits until it detects a zero value for both while, at the same time, updating the values of VCS, VPF and CC based on valid delimiters received over the medium (step 404). It then determines if VPF is equal to one (step 405). If VPF is equal to zero, the frame segment is transmitted and TC is incremented (step 406). If, at step 403, the medium is determined to be idle, the transmitter determines if the arrival has occurred during a Carrier Sense Slot (CSS), that is, during CIFS (step 407). If the arrival has occurred during a CSS, or, at step 405, VPF=1, then the transmitter determines if a signal has been sensed in the CSS (step 408). If the arrival occurred during the CSS (at step 407)

but no signal was sensed during that period (at step 408), or the arrival occurred during one of slots in the Priority Resolution Slots interval (step 409), then the transmitter determines if the previous transmission indicated contention-free access, that is, included a set CC bit (step 410). If contention-free access is indicated, the transmitter determines whether it can interrupt by comparing its priority (the priority of the frame awaiting transmission) to that of the priority indicated in the EOF and/or response, or continue if the last transmission was a previous segment of the frame to be sent (step 412). If the transmitter cannot interrupt or continue (as part of an already in-progress transmission stream, e.g., during a segment burst or exchange of frames between stations during a contention-free period), it sets the VCS value to the EIFS and VPF to zero (step 414). If, at step 412, it is determined that the transmitter can interrupt or continue, or, at step 410, it is determined that contention-free access is not indicated, the transmitter signals its priority and listens for the priority of other stations also awaiting channel access (step 416).

If the transmitter does not detect a higher priority (step 418), it proceeds to contend for channel access (step 419). If the contention is successful, the process transmits the segment and increments the TC (at step 406). If the contention is unsuccessful (that is, another station is currently transmitting), it determines if the frame control field of the current transmission is valid (step 421). If the frame control field is valid, the transmitter sets VPF to one and updates VCS based on that frame control information (step 422), and returns to step 404 to wait for an idle channel. If the frame control field is invalid (as might be the case for a false synch or weak signal), the transmitter returns to step 414 (setting VCS equal to EIFS and VPF=0).

Referring back to step 409, if the frame arrives after the PRS interval but is determined to have arrived during the Contention Window (step 423), the transmitter determines if the previous frame transmission was contention-free (step 424). If contention-free access is not indicated, the transmitter proceeds to step 418 (for determining if a higher priority has been detected). If contention-free access is indicated, the transmitter determines if it can interrupt the transmission (step 426). If the transmitter cannot interrupt, it updates the VCS and VPF at step 414, and returns to step 404 to wait for the next idle channel. If it is determined that the transmitter can interrupt at step 426, the transmitter proceeds to step 418. If the frame is determined to have arrived after the Contention Window at step 423, the transmitter transmits the frame segment and increments the TC by one at step 406.

After a frame segment is transmitted at step 406, the transmitter determines if a response or acknowledgment is expected (step 428). If an acknowledgment is expected and received (step 430), or an acknowledgement is not expected, the transmitter determines if any additional segments are to be transmitted as part of a data transmission stream or burst (step 432). If so, the transmitter resets BPC, TC, NACKcount and NRC to zero (step 433). The transmitter then determines if the frame should be dropped by determining if the FrmTimer is equal to zero or TC exceeds the transmit limit (step 436). If either condition is true, the transmitter reports that the frame has been discarded (step 438) and the process terminates (step 440). If the frame is not to be discarded but instead re-transmitted, the transmitter returns to step 403. If there are no more segments to be transmitted at step 432, the transmitter reports a successful transmission (step 442), and terminates the process at step 440. If an acknowledgment is expected and not received at step 430, the process further resolves the response (step 444) and proceeds to the frame discarding determination at step 436.

Figure 11:
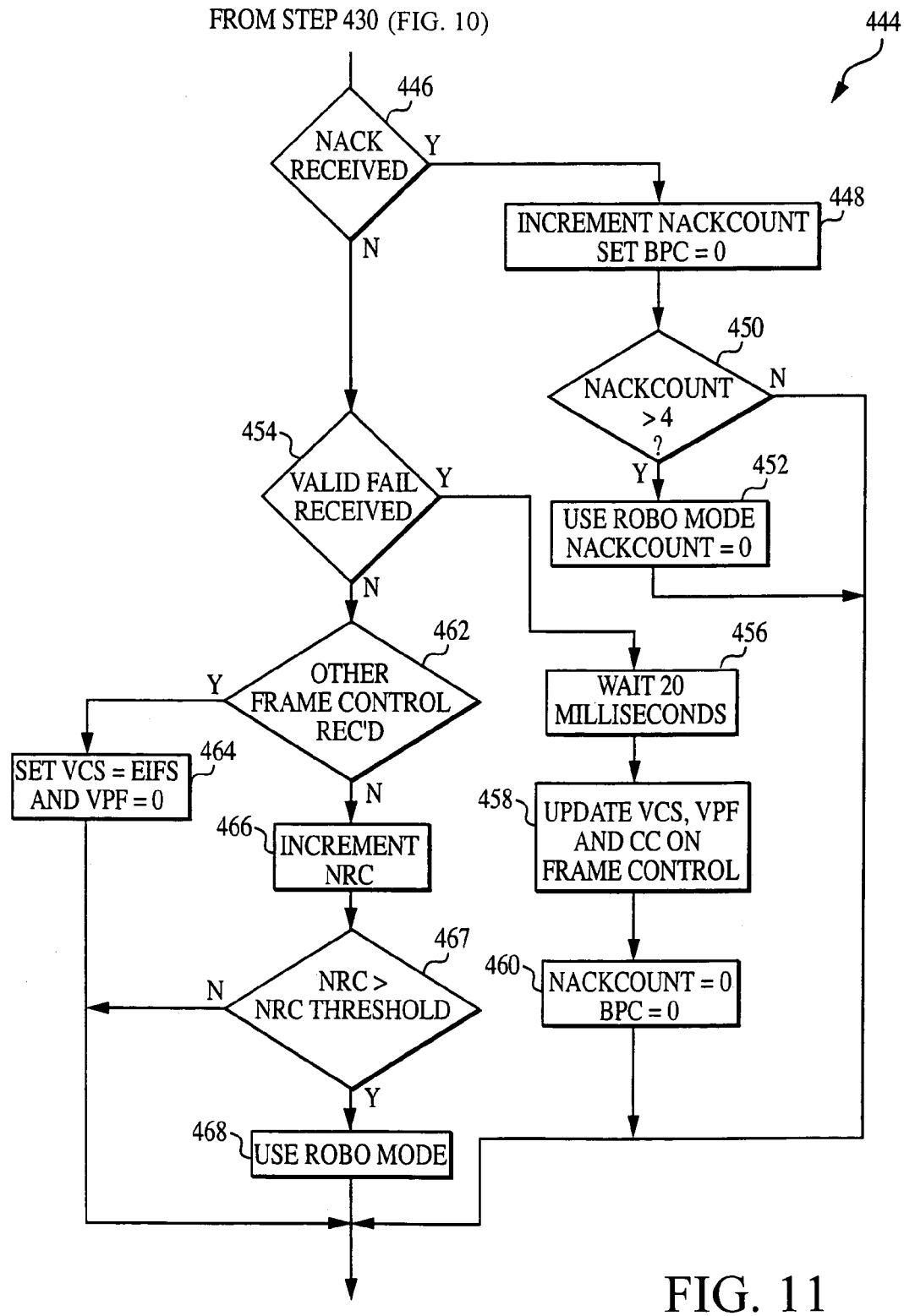
FIG. 11 is a flow diagram of a response resolve process performed by the frame transmit process of FIG. 10.

Referring to FIG. 11, the process of resolving the response 444 begins with determining if a NACK has been received (step 446). If a NACK has been received, the NACKcount is incremented and BPC is set to zero (step 448). The process 444 determines if the NACKcount is greater than the NACKcount threshold (in this example, a threshold of 4) (step 450). If the NACKcount is determined to be greater than the threshold of 4, the process resets the NACKcount to zero and uses the robust (ROBO) transmission mode (step 452), and proceeds to step 436 (FIG. 10). If the NACKcount is not greater than the threshold, the process goes to step 436 directly. If a response is expected and a FAIL response is received (step 454), the process waits a predetermined period, in the illustrated example, 20 ms, (step 456) while updating VCS, VPF and CC on any valid frame control information (step 458), sets both NACKcount and BPC to zero (step 460) and returns to step 436. If a response is expected and no response is received (i.e., no FAIL received at step 454), the process determines if other frame control information has been received (step 462) and, if so, sets VCS to EIFS and VPF to zero (step 464). Otherwise, the process increments NRC (step 466) and determines if the NRC is greater than an NRC threshold (step 467). If the NRC is determined to be greater than the NRC threshold, the process uses ROBO Mode (step 468) and again returns to step 436. If it is determined that the NRC is not greater than the NRC threshold at step 467, the process returns to step 436 without adjustment to modulation mode.

Figure 12:
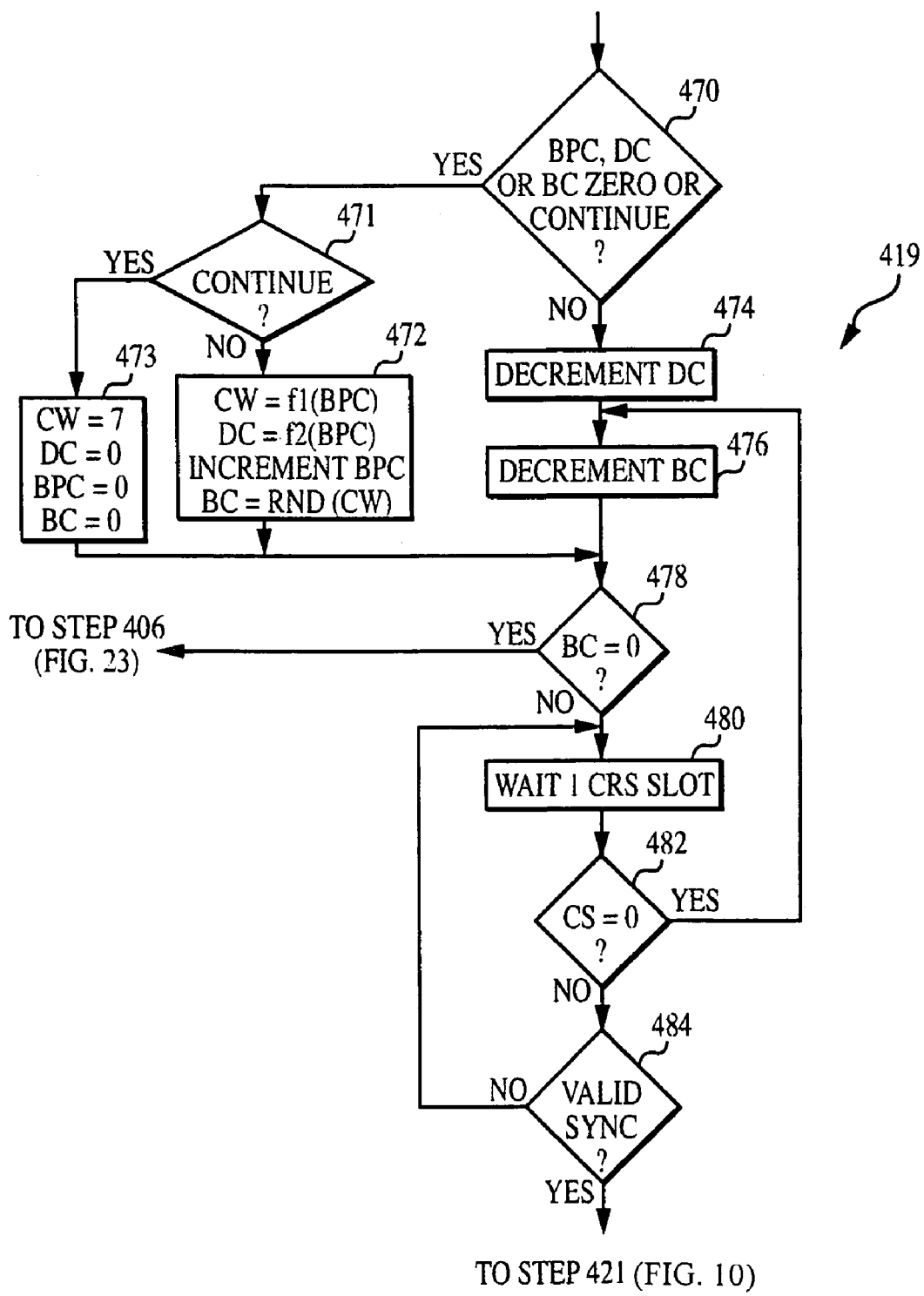
FIG. 12 is a flow diagram of a contend-for-access process performed by the frame transmit process of FIG. 10.

Referring to FIG. 12, the channel access contention process 419 begins by determining if the BPC, DC or BC is zero (step 470). If yes, the process determines if the segment to be transmitted is a continuation of a previous transmission (step 471). If it is not, the process performs the following: establishes the Contention Window CW and the Deferral Count DC as a function of the BPC, that is, CW=f1(BPC), where f1(BPC)=7, 15, 31, 63 for BPC=0, 1, 2, >2, respectively, and DC=f2(BPC), where f2(BPC)=0, 1, 3, 15 for BPC=0, 1, 2, >2, respectively; increments BPC; and sets BC=Rnd(CW), where Rnd(CW) is a uniformly distributed random integer from the interval (0, CW) (step 472). If a continuation (at step 471), then the process sets CW=7, DC=0, BPC=0 and BC=0. If BPC, DC or BC are not zero at step 470, the process decrements DC (step 474) and decrements BC (step 476). After steps 472, 473 or 476, the process 419 determines if BC is equal to zero (step 478). If BC is zero, then the process goes to step 406, initiating packet transmission and incrementing TC (FIG. 10). If BC is not equal to zero, the process waits for one CRS slot (step 480), and determines if CS is equal to zero (step 482). If CS is zero (i.e., a carrier is not detected), the process returns to step 476 (decrementing BC). If CS is not equal to zero at step 482, the process 419 determines if the synchronization signal in the current transmission is valid (step 484). If the signal is invalid, the process 419 returns to step 480 to wait the duration of another CRS slot. If the synchronization signal is valid, the process 419 proceeds to step 421 (FIG. 10) to determine the validity of the frame control field in the delimiter of the current transmission and thus no further contention is permitted.

Operation of Stations Providing Priority Promotion

In some implementations, stations providing QoS guarantees (or other stations needing immediate access to the network) use temporary priority promotion to preempt an ongoing burst transmission. When it is a legacy HomePlug 1.0 station that has its burst transmission preempted, the promoted priority is asserted in the Home Plug 1.0 priority resolution slots. This has the effect of interrupting the burst transmission of the HomePlug 1.0 station, as such a station checks the content of the priority resolution slots following each transmitted segment, and interrupts its burst transmission if a priority greater than its own priority is asserted in those slots. After asserting the promoted priority to interrupt the burst transmission, the QoS guarantee station returns to contending at its normal priority level. Thus, for example, it may use the actual priority of the traffic it is attempting to send in the next contention period.

A station may use temporary priority promotion even when it is not, itself, attempting to send traffic. A station may use temporary priority promotion to assist in the transmission of traffic by other stations (e.g., QoS guaranteed traffic by other stations) by asserting signals in the priority resolution slots to interrupt a burst transmission from a legacy station. For example, if certain repeated intervals are used for QoS guaranteed transmissions, then arrangements could be made for multiple stations to use priority promotion to prevent any HomePlug 1.0 stations of lower priority from accessing the medium during these intervals.

Some implementations assert the temporarily promoted priority in so-called priority resolution slots. But other ways could be implemented for temporarily asserting a higher priority.

Typically, priority promotion is used to interrupt burst transmissions, but there are circumstances in which priority promotion can be used to interrupt non-burst transmissions, to achieve a more desirable distribution of access to the network medium.

Some implementations may involve providing improved QoS guarantees, but other implementations do not involve improving QoS. An example of where priority promotion does not involve improving QoS is when a low data rate connection exists between two stations on a powerline network. Powerline stations use channel adaptation to maximize the throughput on each communication link. Thus, two stations that connected through a good link communicate at high data rates while stations connected through a bad link communicate at low data rate. At low data rate, a single MSDU may be divided into several segments and be transmitted using several MPDUs. Multiple MPDUs carrying segments of the same MSDU are transmitted in a burst. This causes unfair sharing of the medium as most of the transmission time is used by low data rate connections. Priority promotion can be used to reduce the effect of such unfair access to the medium. A station can assert at a higher priority in the PRS slots, thus interrupting the ongoing burst. Following the PRS slots, if the station has pending MPDUs, it contends in the contention window using normal priority.

Figure 3:
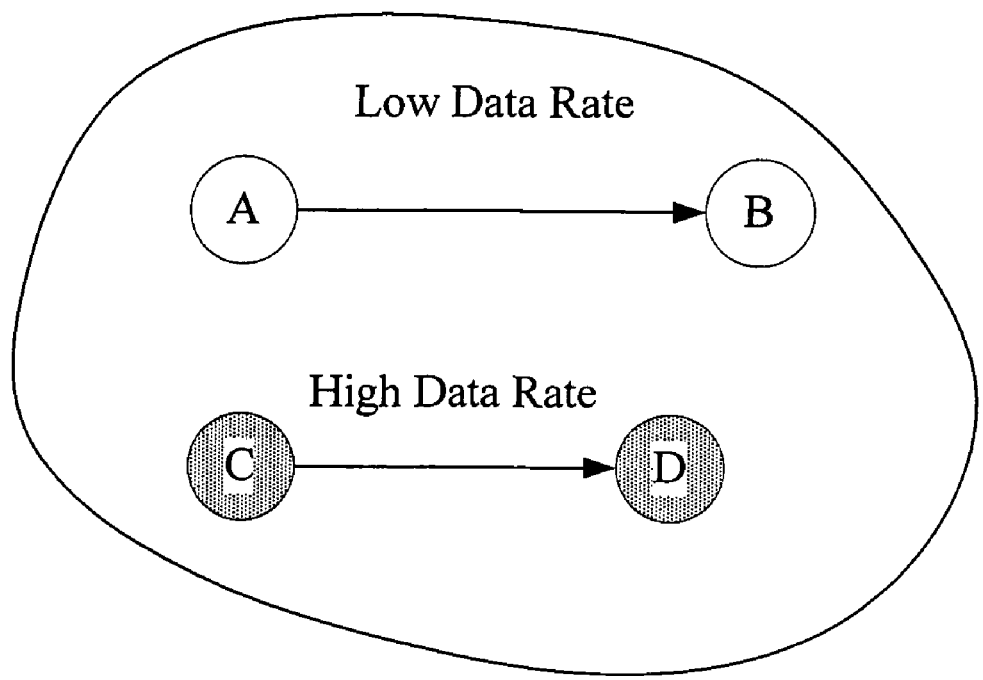
FIG. 3 is a diagram of an example of the use of priority promotion to improve network performance.

FIG. 3 shows an example of a network where temporary priority promotion is used to improve network performance. The network includes two HomePlug 1.0 legacy stations (A and B) and two new generation stations (C and D) implementing the protocol described herein. The communication link from station A to B has a low data rate and station A is transmitting MPDUs to station B. The communication link from station C to D has high data rate and station C is transmitting MPDUs to station D. Due to MPDU bursting, station A is obtaining an unfair share of the medium, thus reducing the network throughput. To prevent this, priority promotion can be used by station C and/or D. Any of a variety of mechanisms may be used to trigger priority promotion. Three examples are as follows:

1. Station C and/or D always use priority promotion to preempt any ongoing burst of MPDUs from Station A to Station B.
 2. Station C and/or D use priority promotion to preempt an ongoing burst if it spans more than a certain number of MPDUs. For example, priority promotion could be triggered if the burst spans more that 2 MPDUs.
 3. Station C and/or D always use priority promotion to preempt MPDU bursts that are using a robust transmission protocol such as Robo Modulation (as described in U.S. Pat. No. 6,278,685). Robo Modulation, a feature of HomePlug 1.0, is indicative of a low data rate transmission.

Note that priority promotion can be used by stations even if they are not transmitting or receiving MPDUs. In this case, interruption of a burst increases the network throughput by providing HomePlug 1.0 high data rate links a better opportunity to access the medium.

One application in which temporary priority promotion is of particular advantage is when there are stations on the network that are attempting to provide quality of service (QoS) guarantees.

HomePlug 1.0 stations use CSMA/CA channel access protocol along with priority signaling to provide differentiated services to application streams. Due to the non-deterministic nature of channel access used in CSMA/CA, it is difficult to provide high levels of QoS guarantees. New generation stations that use an enhanced mechanism to provide QoS need to operate in networks that include legacy HomePlug 1.0 stations. Priority promotion can be used as a means to prevent any HomePlug 1.0 stations from accessing the medium during certain intervals of time. Note that this mechanism prevents both regular and burst MPDU transmissions from HomePlug 1.0 stations. Several approaches can be used by stations to trigger priority promotion and hence provide QoS guarantees.

The new generation stations can use a variety of variety of access mechanisms for providing QoS guarantees. One example of such mechanism includes periodic TDMA access. Another example includes the access mechanism described in U.S. Provisional Application No. 60/420,071 (Contention-Free Access Intervals on a CSMA Network).

Figure 4:
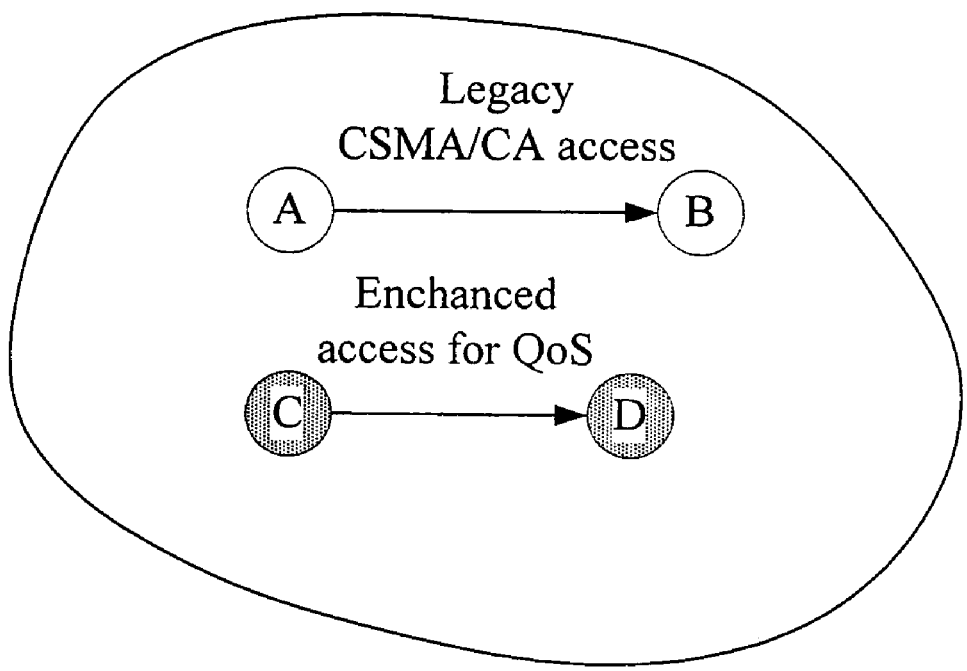
FIG. 4 is a diagram of an example of the use of priority promotion to improve QoS guarantees.
Figure 5:
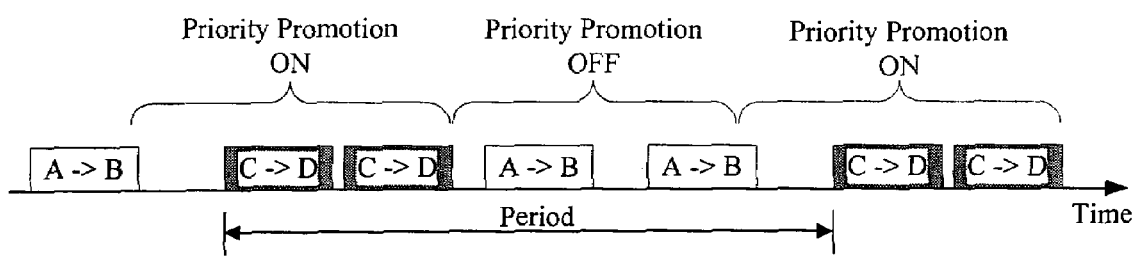
FIG. 5 is a depiction of the use of priority promotion at periodic intervals to provide QoS guarantees.

FIG. 4 shows an example of a network where priority promotion can be used to improve network performance. The network includes two HomePlug 1.0 legacy stations (A and B) and two new generation stations (C and D) implementing the protocol described herein. Stations C and D use periodic TDMA access to provide QoS guarantees. FIG. 5 shows the activity on the medium. Station C periodically transmits two MPDU to station D, while the rest of the time is used by CSMA/CA transmissions from station A to station B. Priority promotion can be used by Stations C and/or D to prevent HomePlug 1.0 stations from accessing the medium during the periodic intervals. Priority promotion can also be triggered when a new generation station detects a HomePlug 1.0 transmission during an expected period access interval.

Stations may use the priority promotion mechanism in various circumstances, including:

1. Always using priority promotion to preempt any ongoing burst transmission between HomePlug 1.0 stations if there is traffic between the QoS guarantee stations at the same priority.
 2. Only using priority promotion if the burst transmission spans more than a fixed number of MPDUs.
 3. Always using priority promotion to preempt if the transmission is a robust transmission protocol such as Robo Modulation (as described in U.S. Pat. No. 6,278,685).
 4. Always using priority promotion during certain periodic intervals.

Many other implementations are within the scope of the following claims.

The invention claimed is:

1. A method of operating in a network in which a plurality of stations communicate over a shared medium, the method comprising having the stations contend for access to the shared medium using a contention procedure that relies on a priority level, wherein transmissions with a lower priority level have a reduced chance of gaining access to the shared medium during a contention process;

at each of a plurality of selected stations, temporarily promoting the priority level of transmissions that at least some of the selected stations are attempting to make to effect access to the shared medium without waiting for indication that the at least some of the selected stations have access to the shared medium, wherein the priority level is increased during an interval used by the selected stations for transmission of traffic not suited for the contention procedure, to reduce a chance that other stations gain access to the shared medium during that interval, and the priority level is restored to a normal level following the interval; and at each of the at least some of the selected stations, transmitting traffic over the shared medium.

2. The method of claim 1 wherein the promoted priority level is used to interrupt a series of frames having a priority level such that the series of frames cannot be interrupted by transmissions of a same or lower priority level.

3. The method of claim 2 wherein the priority level is restored to the normal level for contention following the interrupted burst.

4. The method of claim 1 wherein the promoted priority level is used not to interrupt burst traffic but to reduce the chance that some stations gain access to the shared medium.

5. The method of claim 1 wherein priority may be promoted by a station under predefined circumstances.

6. The method of claim 5 wherein the predefined circumstances include detection that another station is using a robust transmission protocol indicative of a low transmission rate.

7. The method of claim 5 wherein the predefined circumstances include that the burst transmission has continued uninterrupted for more than a defined number of frames.

8. The method of claim 1 wherein the selected stations use the same communication protocol as the other stations.

9. The method of claim 1 wherein the selected stations employ a QoS guarantee protocol and the other stations are legacy stations lacking a QoS guarantee protocol.

10. The method of claim 2 wherein a station transmitting the burst follows a protocol that requires the station to interrupt a burst transmission if a higher priority level is asserted in priority resolution slots between frames, and at the selected stations, increasing the priority that the selected stations assert in the priority resolution slots to interrupt the burst transmission.

11. The method of claim 1 wherein a selected station asserting a temporarily promoted priority has data to transmit.

12. The method of claim 1 wherein a selected station asserting a temporarily promoted priority does not have data to transmit.

13. The method of claim 4 or 12 wherein a selected station asserts the promoted priority to assist other stations by:

increasing a likelihood that stations will see the promoted priority, and on seeing the promoted priority, the stations refrain from transmission.

14. The method of claim 13 wherein the selected station employs a QoS guarantee protocol that transmits QoS traffic during regularly repeated contention free intervals, and by asserting the promoted priority the station increases a likelihood that other stations do not attempt to transmit during the regularly repeated contention free intervals.

15. A method of operating in a network in which a plurality of stations communicate over a shared medium, the method comprising:

having the stations contend for access to the shared medium using a contention procedure that relies on a priority level, wherein transmissions with a lower priority level have a reduced chance of gaining access to the shared medium during a contention process;

at each of a plurality of selected stations using a first protocol having QoS guarantees, temporarily promoting the priority level of transmissions that at least some of the selected stations are attempting to make to effect access to the shared medium without waiting for indication that the at least some of the selected stations have access to the shared medium, wherein the priority level is increased during an interval to reduce a chance that stations using a legacy protocol gain access to the shared medium during that interval, and the priority level is restored to its normal level following the interval; and at each of the at least some of the selected stations, transmitting traffic over the shared medium.

16. The method of claim 15 wherein the selected stations using a first protocol having QoS guarantees transmit QoS traffic during contention free intervals, and in response to temporarily promoting the priority level of transmissions, the selected stations block stations using the legacy protocol from transmitting during the intervals.

17. The method of claim 15 wherein the first protocol supports time division multiple access based channel access for QoS traffic, and the legacy protocol supports carrier sense multiple access based channel access.

18. The method of claim 15 wherein the selected stations temporarily promote the priority level of transmissions they are attempting to make by transmitting priority signals during allocations for priority resolution slots in the transmissions by the selected stations.

19. A method of operating in a network in which a plurality of stations communicate over a shared medium, the method comprising having the stations contend for access to the shared medium using a contention procedure that relies on a priority level, wherein transmissions with a lower priority level have a reduced chance of gaining access to the shared medium during a contention process;

at each of a plurality of selected stations, temporarily promoting the priority level of transmissions that at least some of the selected stations are attempting to make, wherein the priority level is increased during an interval used by the selected stations for transmission of traffic not suited for the contention procedure, to reduce a chance that other stations gain access to the shared medium during that interval, and the priority level is restored to a normal level following the interval; and at each of the at least some of the selected stations, transmitting traffic over the shared medium;

wherein a first selected station asserting a temporarily promoted priority has data to transmit, and a second selected station asserting the temporarily promoted priority does not have data to transmit and asserts the temporarily promoted priority to assist in the transmission of data by the first selected station.

20. The method of claim 19 wherein the promoted priority level is used to interrupt a series of frames having a priority level such that the series of frames cannot be interrupted by transmissions of a same or lower priority level.

21. The method of claim 20 wherein the priority level is restored to the normal level for contention following the interrupted burst.

22. The method of claim 20 wherein a station transmitting the burst follows a protocol that requires the station to interrupt a burst transmission if a higher priority level is asserted in priority resolution slots between frames, and at the selected stations, increasing the priority that the selected stations assert in the priority resolution slots to interrupt the burst transmission.

23. The method of claim 19 wherein the promoted priority level is used not to interrupt burst traffic but to reduce the chance that some stations gain access to the shared medium.

24. The method of claim 23 wherein a selected station asserts the promoted priority to assist other stations by:
increasing a likelihood that stations will see the promoted priority, and
on seeing the promoted priority, the stations refrain from transmission.

25. The method of claim 24 wherein the selected station employs a QoS guarantee protocol that transmits QoS traffic during regularly repeated contention free intervals, and by asserting the promoted priority the station increases a likelihood that other stations do not attempt to transmit during the regularly repeated contention free intervals.

26. The method of claim 19 wherein priority may be promoted by a station under predefined circumstances.

27. The method of claim 26 wherein the predefined circumstances include detection that another station is using a robust transmission protocol indicative of a low transmission rate.

28. The method of claim 26 wherein the predefined circumstances include that the burst transmission has continued uninterrupted for more than a defined number of frames.

29. The method of claim 19 wherein the selected stations use the same communication protocol as the other stations.

30. The method of claim 19 wherein the selected stations employ a QoS guarantee protocol and the other stations are legacy stations lacking a QoS guarantee protocol.

31. A method of operating in a network in which a plurality of stations communicate over a shared medium, the method comprising:
having the stations contend for access to the shared medium using a contention procedure that relies on a priority level, wherein transmissions with a lower priority level have a reduced chance of gaining access to the shared medium during a contention process;
at each of a plurality of selected stations using a first protocol having QoS guarantees, temporarily promoting the priority level of transmissions that at least some of the selected stations are attempting to make, wherein the priority level is increased during an interval to reduce a chance that stations using a legacy protocol gain access to the shared medium during that interval, and the priority level is restored to its normal level following the interval; and
at each of the at least some of the selected stations, transmitting traffic over the shared medium;
wherein a first selected station asserting a temporarily promoted priority has data to transmit, and a second selected station asserting the temporarily promoted priority does not have data to transmit and asserts the temporarily promoted priority to assist in the transmission of data by the first selected station.

32. The method of claim 31 wherein the selected stations using a first protocol having QoS guarantees transmit QoS traffic during contention free intervals, and
in response to temporarily promoting the priority level of transmissions, the selected stations block stations using the legacy protocol from transmitting during the intervals.

33. The method of claim 31 wherein the first protocol supports time division multiple access based channel access for QoS traffic, and the legacy protocol supports carrier sense multiple access based channel access.

34. The method of claim 31 wherein the selected stations temporarily promote the priority level of transmissions they are attempting to make by transmitting priority signals during allocations for priority resolution slots in the transmissions by the selected stations.

* * * * *

UNITED STATES PATENT AND TRADEMARK OFFICE
CERTIFICATE OF CORRECTION

PATENT NO. : 7,660,327 B2 Page 1 of 1
APPLICATION NO. : 10/771136
DATED : February 9, 2010
INVENTOR(S) : Katar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1107 days.

Signed and Sealed this

Thirtieth Day of November, 2010

David J. Kappos
*Director of the United States Patent and Trademark Office*